United States Patent [19]

Ito et al.

[11] 4,435,821

[45] Mar. 6, 1984

[54] RECEIVER IN A FREQUENCY HOPPING COMMUNICATION SYSTEM

[75] Inventors: Satoaki Ito; Hiroshi Harada, both of Tokyo, Japan

[73] Assignee: Nippon Electric Co., Ltd., Tokyo, Japan

[21] Appl. No.: 360,536

[22] Filed: Mar. 22, 1982

[30] Foreign Application Priority Data

Mar. 24, 1981 [JP] Japan ................................ 56-42952
Mar. 24, 1981 [JP] Japan ................................ 56-42953
Dec. 15, 1981 [JP] Japan ............................. 56-202160
Dec. 15, 1981 [JP] Japan ............................. 56-202161

[51] Int. Cl.³ .......................... H04K 1/00; H04L 9/00
[52] U.S. Cl. ........................................ 375/1; 375/115; 455/266
[58] Field of Search .................. 375/1, 106, 2, 114, 375/115; 370/100, 107; 455/29, 266; 343/5 PN

[56] References Cited

U.S. PATENT DOCUMENTS

| | | | |
|---|---|---|---|
| 3,932,705 | 1/1976 | Wulleman | 370/100 |
| 4,039,749 | 8/1977 | Gordy et al. | 375/1 |
| 4,215,239 | 7/1980 | Gordy et al. | 370/100 |
| 4,365,330 | 12/1982 | Chopping et al. | 370/100 |

OTHER PUBLICATIONS

Ing et al., "Mean Acquisition Time of Active and Passive-Correction Acquisition System for Spread-Spectrum Communication System" IEEE Proceeding, vol. 128, No. 4, Aug. 1981, pp. 211-213.

Primary Examiner—Robert L. Griffin
Assistant Examiner—Stephen Chin
Attorney, Agent, or Firm—Sughrue, Mion, Zinn, Macpeak & Seas

[57] ABSTRACT

A frequency hopping spread spectrum demodulator includes a broad band filter covering the spread spectrum bandwidth and a narrow band filter which can be selected to pass any one of a number of subbands making up the spread spectrum bandwidth. The filter is switched from broad to narrow band in response to determination of synchronization acquisition. Synchronization acquisition itself is accomplished in one embodiment by summing the outputs from a plurality of channels each selectively receiving one of a number of predetermined hopping frequencies, and threshold-comparing the summed signal to test for synchronization. In an alternate configuration, the received signal and a local reference signal are correlated, the correlated signal is integrated, and the integrated signal is then compared to a threshold, with synchronization being determined when an output from either one of the threshold comparator or integrator is present.

13 Claims, 21 Drawing Figures

RECEIVER IN A FREQUENCY HOPPING COMMUNICATION SYSTEM

BACKGROUND OF THE INVENTION

The present invention relates to a receiver hardly affected by interference and jamming with a simple construction and a rapid synchronization acquisition (search) in a spread spectrum communication system, particularly in a frequency hopping communication system.

The spread spectrum (SS) communication system has been used in a variety of fields. In the communication system of this type, the transmitted bandwidth is much greater than the bandwidth or rate of the information to be transmitted. The carrier wave is modulated by some other function to widen or spread the bandwidth for transmission. The received signal is remapped into the original information bandwidth to reproduce a desired signal. The SS communication system has many useful adavantages: a selective call is possible; since the power spectrum density is low, private communication is allowed; it is little influenced by interference. From this standpoint, the SS system has found many uses, such as mobile communications, avionics systems, satellite communications, direction finders and distance measuring equipment.

The SS system is categorized into a direct sequence (DS) system, a frequency hopping (FH) system, a time hopping (TH) system and a hybrid system which is a proper combination of these systems as just mentioned. Of those communications systems, the FH system is frequently used in the field of mobile communication system with a low traffic volumn for a number of stations.

In the FH system a carrier frequency is shifted or jumped in discrete increments in a pattern dictated by prepared code sequences (e.g. PN code, M-sequence codes, Gold codes and the like) in synchronism with a change in a state of the codes. The resulting consecutive and time sequential frequency pattern is called a hopping pattern and the duration of each hopping frequency is called a chip. The transmitting information is embedded in the codes or embedded in each frequency of the carrier wave by a so-called FSK (frequency shift keying) modulation. The information signal thus spread-spectrum-modulated is reproduced by a receiver.

In reproducing the information signal by the receiver, a synchronization (sync) acquisition process is first performed, in which the code pattern provided in the receiver is made accurately coincident with the code pattern generated in the transmitter in time-position. Then, the SS signal is despread, and thereafter a well-known demodulation is performed to extract the desired information. More particularly, a local reference signal of a frequency correspondingly determined by the same code pattern as that in the transmitter for every chip and the received signal are mixed in a mixer in order to perform a correlation (despreading) process for converting the SS signal into the signal having a frequency bandwidth wide enough to extract the information. This system is described in detail in "SPREAD SPECTRUM SYSTEMS" by R. C. Dixon, published by John Wiley & Sons ZInc. in 1976. Following this despreading process, the desired information is extracted by a usual demodulation technique.

In the FH system, the number of the frequencies to be selected generally reaches several thousands and the carrier frequency changes over a wide frequency bandwidth irregularly. For this reason, a broad band filter for suppressing signals existing outside the SS frequency bandwidth is provided preceding a sync section and a demodulating section. In this case, a signal in the SS frequency bandwidth coming from another station adjacent to that of the station under discussion is directly applied to the mixer through the broad band filter. If the level of the signal transmitted from the adjacent station is extremely high, the mixer operates outside its linear dynamic characteristic, so that it produces higher harmonic components to cause problems of jamming, interference, etc. For example, a ring modulation circuit using diodes has usually been employed for the mixer. When an input signal with a level exceeding the linear dynamic range of the diode comes in, a higher harmonic component is contained in its output signal. As a result, a number of unnecessary signals (spurious signals) are supplied into the circuits succeeding to the mixer. This causes an erroneous sync acquisition, data error, etc, to adversely affect a normal communication.

The signal, after passing through the broad band-pass filter, enters the demodulating section and the sync section. The sync process in the sync section contains a sync acquisition process for timing a local reference signal generated according to the code pattern in the receiver with the received signal and a sync tracking process for keeping the sync state. The sync tracking is performed by the known DLL (delay line lock) circuit. For the details of the sync tracking, reference is made to the above "SPREAD SPECTRUM SYSTEMS" by R. C. Dixon. In the specification, however, no further explanation of the sync tracking will be given, since the sync tracking process is not directly pertinent to the present invention.

Sync acquisition systems now proposed are categorized into active correlation systems and a passive correlation systems, as discussed by M. Pandit in his paper "Mean acquisition time of active- and passive-correlation acquisition systems for spread-spectrum communication systems", IEE PROC., Vol. 128, Pt. F, No. 4, AUGUST 1981; PP 211 to 214. A typical example of the former correlation system is a sliding correlation system described in "6.1 INITIAL SYNCHRONIZATION" on page 180 and the subsequent pages in the above text "SPREAD SPECTRUM SYSTEMS". In the sliding correlation system, a time relation between the received signal and the local reference signal is discretely slid by changing a phase of a clock signal for driving the local reference signal and a correlation between the received signal and the local reference signal is observed. The phase changing of the clock is stopped at a maximum point of the correlation. The sliding correlation system is advantageous in that the construction is simple, but disadvantageous in long acquisition time for sync because of discrete change of the clock phase.

A typical example of the latter correlation system capable of a short acquisition, or the passive correlation system, is a correlation system using a matched filter. In this system, selective receiving channels are specially provided for receiving certain predetermined information. At the time that the information are received by all of the receiving channels, the correlation system judges that the sync is acquired. However, for applying this correlation system to a frequency hopping spread spectrum (FH-SS) communication system, it is necessary to use the selective receiving channels (each containing a frequency synthesizer, a correlator, an IF amplifier, an envelope detector, etc.) equal in number to the hopping frequencies. Further, a number of delay lines for timing the output signals from the receiving channels are required. This complicates the construction of the correlation system.

As described above, various systems as the sync acquisition means for the SS communication system have been proposed. So far as we know, however, there has never been realized a practical sync acquisition means appropriately adaptable for the FH-SS communication

SUMMARY OF THE INVENTION

Accordingly, an object of the present invention is to provide a receiver in a frequency hopping communication system which is hardly affected by interference and jamming, and which has a simple construction.

Another object of the present invention is to provide a receiver in a frequency hopping communication system having a simplified synchronizing section with a short synchronization acquisition time.

Yet another object of the present invention is to provide a receiver in a frequency hopping communication system having a synchronizing section hard to erroneously operate in response to jamming and interference signals.

A further object of the present invention is to provide a receiver in a frequency hopping communication system having a synchronizing section insensitive to a chip drop in the received signal and capable of a highly accurate synchronization acquisition.

A receiver in a frequency hopping communication system according to the present invention comprises, at a stage prior to the demodulating and synchronizing sections, a filter means including a broad band-pass filter with a band characteristic covering a spread spectrum bandwidth, and a narrow band-pass filter with a plurality of band characteristics obtained by dividing the spread spectrum bandwidth into a plurality of subbands. A band characteristic of the narrow band-pass filter is selected responsive to a selection signal applied thereto and the broad band-pass filter is switched over to the narrow band-pass filter in response to a synchronization detected signal applied thereto. The receiver also has a relatively simple synchronization acquisition means. The synchronization acquisition means employs a relatively small number of receiving channels for selectively receiving signals of predetermined frequencies corresponding to predetermined hopping frequencies. After the output signals from the receiving channels are timed, these signals are summed. When the summed signal exceeds a predetermined threshold value, it is judged that synchronization is achieved and the synchronization detected signal is produced. According to another aspect of the present invention, the sycnchronization acquisition means merely includes a correlator for correlating a local reference signal from the frequency synthesizer and a received signal, a detecting means for envelope-detecting the output signal from the correlator, an integrating means for integrating the output signal from said detecting means to produce an output signal when the integrated value is above a predetermined threshold value, and a gate circuit for producing the synchronization detected signal indicating the set-up of a perfect synchronization when either of the output signals from the detecting means and the integrating means is present.

DETAILED DESCRIPTION OF THE PREFERRED EMBODIMENTS

Figure 1:
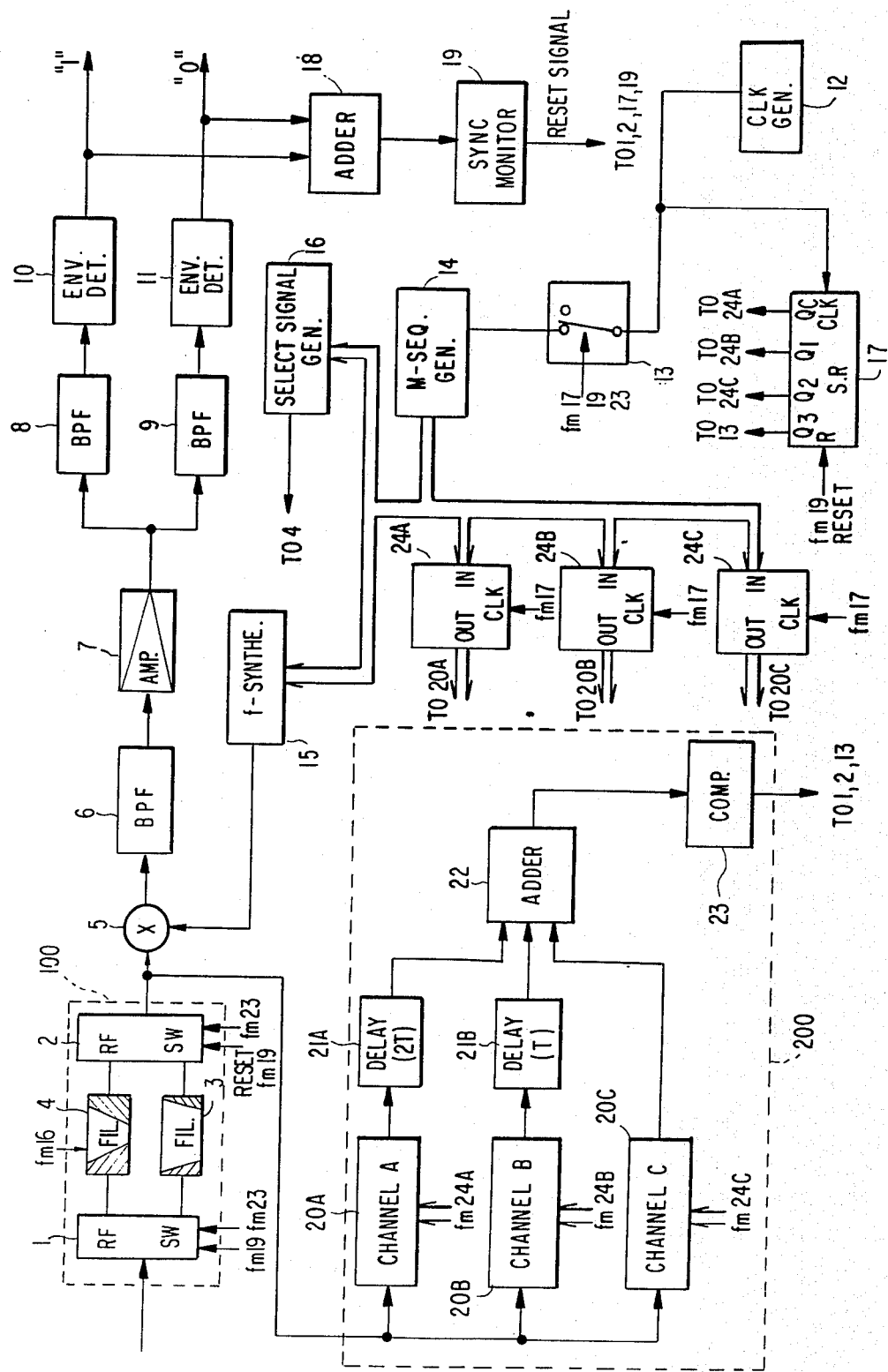
FIG. 1 is a block diagram illustrating a conception of a receiver in a frequency hopping communication system according to the present invention.

An outline of an overall operation of a receiver in a frequency hopping communication system according to the present invention will be described with reference to FIG. 1 illustrating a basic arrangement of the receiver. In the explanation to follow, it is assumed that a frequency determined by a code pattern generated from a code generator is shifted (binary FSK modulated) by a given discrete amount $\Delta f$ only when data to be trnsmitted is "1". It is assumed that the code pattern belongs to an M-sequence code and is expressed by a digital value. It is further assumed that as the digital value is larger, the frequency to be selected is larger.

In connection with a path of a spread spectrum (SS) signal, before its synchronization (sync) is acquired, a broad band-pass filter (BPF) 3 with a slightly broader frquency bandwidth than a spread spectrum frequency bandwidth is selected through the operation of RF switches 1 and 2. After the sync acquisition, a narrow band-pass filter 4 with frequency band characteristics given by dividing the spread frequency bandwidth into a plurality of subbands is selected by the switches. Further, the frequency band characteristic of the narrow band-pass filter 4 is selected in response to a code pattern produced from an M-sequence generator 14 with a signal for selecting the frequency band characteristic being generated from a selection signal generator 16. The RF switches 1 and 2, constituted of known high frequency diodes, operate to connect the broad band-pass filter 3 with an external circuit in a condition that the sync is not acquired and when a reset signal representing an off-sync supplied from a sync monitor 19 to be described later is produced. The RF switches 1 and 2 also operate to connect the narrow band-pass filter 4 with the external circuit responsive to a sync detected signal when the sync is acquired. As the result of the switching operation, after the sync acquisition, the frequency of the input signal applied to the mixer 5 is remarkably limited by the narrow band-pass filter 4. Accordingly, the spurious wave signal problem due to the excessive level interference signal applied to the mixer 5 is almost solved.

The mixer 5, constituted of a known double balanced mixer (DBM), correlates a received signal and a local reference signal of a frequency given by a known frequency synthesizer which is, by a predetermined intermediate frequency $f_{IF}$, lower than the frequency determined by the output signal from the M-sequence generator 14, thereby producing a difference frequency component between them. The output signal from the mixer 5 is applied to a band-pass filter (BPF) 6 where its IF component signal is extracted. The extracted IF component signal then is amplified by an intermediate frequency amplifier (IF-AMP) 7. The output signal from the amplifier 7 is a binary FSK signal; a correlation signal of $(\Delta f + f_{IF})$ for "1" of the transmission data, and a correlation signal of $f_{IF}$ for "0". Accordingly, the digital data can easily be demodulated by an FSK demodulator section made up of band-pass filters 8 and 9 for $(\Delta f + f_{IF})$ and $(f_{IF})$, and envelope detectors 10 and 11 provided at their outputs.

The output signal from the BPF section 100 is subjected to a sync search by a sync search or acquisition means to be described later. When it is judged that the sync is acquired, the sync section 200 produces a sync detected signal.

The M-sequence generator 14, which is identical to that in the transmitter, is driven by clock pulses supplied from a clock source 12 through a switch 13. Upon receipt of an M-sequence code pattern, a selection signal generator 16 generates a selection signal for specifying a frequency band characteristic of the narrow band filter 4 corresponding to a frequency determined by the code pattern.

The output signals from the envelope detectors 10 and 11 are summed in an adder 18 and the summed signal is transferred to a sync monitor 19. The sync monitor 19 counts the number of occurrences of a state that the adder's output signal is below a predetermined threshold level during one period of the M-sequence codes. When the count number is above the predetermined number, the sync monitor 19 judges that the sync is not acquired and produces a reset signal to initialize again the receiver system for the sync acquisition.

Figure 2:
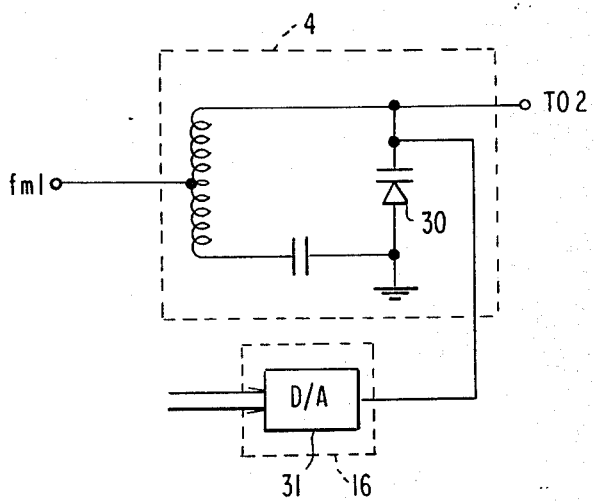
FIG. 2 is a circuit diagram illustrating an arrangement of a narrow band-pass filter 4 and a selection signal generator 16 for generating a selection signal, which is used in the receiver in FIG. 1.
Figure 3:
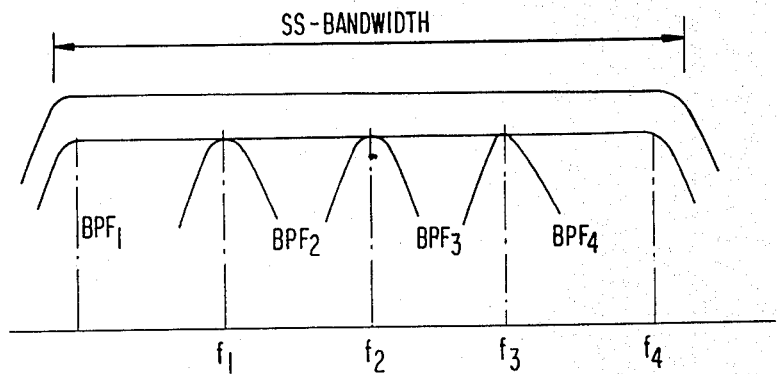
FIG. 3 is an explanatory diagram illustrating a relationship of the frequency bands when a frequency bandwidth of a spread spectrum signal is divided into four subbands.
Figure 5:
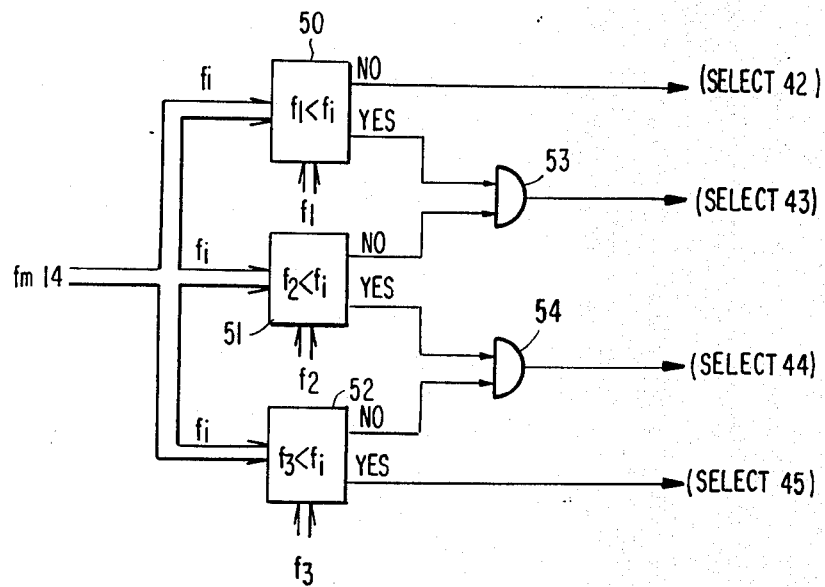
FIG. 5 is a circuit diagram of a selection signal generator 16 for generating a selection signal for switching the band-pass filters 42 to 45 shown in FIG. 4.

Turning now to FIG. 2, there is shown a practical arrangement of the narrow band-pass filter 4 and the selection signal generator 16. The narrow band-pass filter 4 is composed of an LC resonance circuit using a variable capacitance diode 30, with the center frequency variable by changing a control voltage Vc applied from generator 16. The control voltage Vc is obtained by a D/A converter 31 which converts the digital signal generated from the M-sequence generator 14 into an analog signal. With this connection, the control voltage Vc applied to the diode 30 changes according to the M-sequence pattern generated every chip in the receiver, so that it is possible to control the band characteristic of the narrow band-pass filter 4 according to the frequency determined by the M-sequence pattern. The number of the center frequencies to be selected may be the number N of the hopping frequencies. Nevertheless, to simplify the hardware construction, it is advisable that the SS bandwidth is divided into subbands the number of which is less than N. In this case, the representative frequency representing each of the subbands is previously selected, and the BPF characteristic of the subband to be selected is determined by comparing each of the frequencies with the frequency corresponding to the M-sequence code pattern generated in the receiver. Assume that the frequencies $f_1$ to $f_3$ at which adjacent characteristic curves of four BPF characteristics, obtained by dividing by four the SS bandwidth as shown in FIG. 3, overlap one another. The BPF characteristic to be selected is determined by comparing the frequency given by the code pattern from the M-sequence generator 14 with each of the frequencies $f_1$ to $f_3$. A practical arrangement to realize this is illustrated in FIG. 5 which will be described below.

Figure 4:
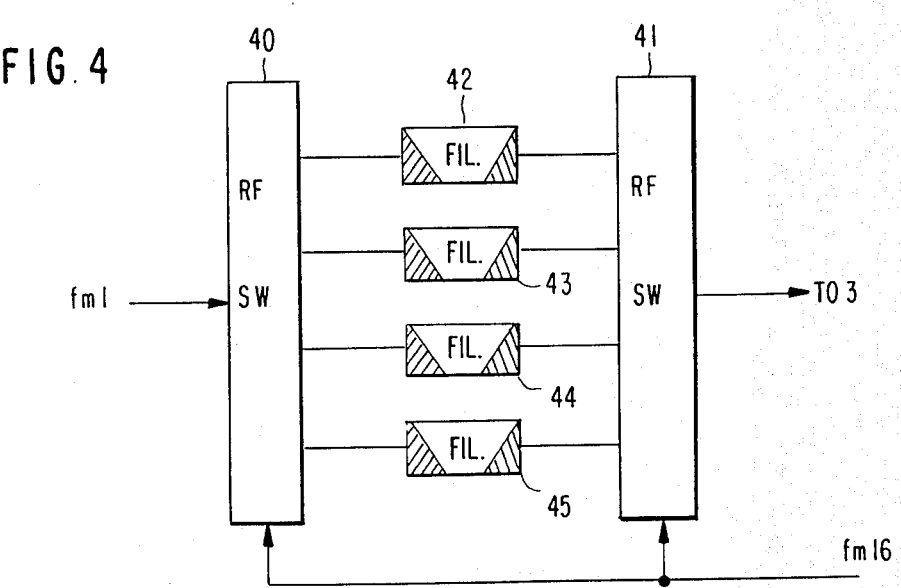
FIG. 4 is a block diagram of another arrangement of a narrow band-pass filter 4 in FIG. 1.

FIG. 4 shows another arrangement of the narrow band-pass filter 4 and the selection signal generator circuit 16. In this arrangement, one of the four band-pass filters (BPF) 42 to 45, having frequency characteristics $BPF_1$ to $BPF_4$ as shown in FIG. 3, is selected in accordance with the code pattern from the M-sequence code generator 14. The selection of those filters 42 to 45 is carried out in a manner that, as in the previous case, the selection signal generated by the selection signal generator 16 shown in FIG. 3, in response to the M-sequence code pattern, controls RF switches 40 and 41 comprising known high frequency diodes. Referring now to FIG. 5, the M-sequence code patterns (of digital values) corresponding to the frequencies $f_1$ to $f_3$ shown in FIG. 3 are predetermined, and these digital values are used as reference values for the comparators 50 to 52. The code pattern $f_i$ which is a digital value corresponding to the M-sequence code pattern is compared with the reference value of each comparator and the compared result is supplied to AND gates 53 and 54 where it is subjected to a logic judgement, thereby to select a proper BPF. The logic judgement and the BPFs with frequency characteristics to be selected are tabulated below.

| Comparing Result | Selected BPF |
| --- | --- |
| $f_i < f_1$ | BPF1 (42) |
| $f_i > f_1$ and $f_i < f_2$ | BPF2 (43) |
| $f_i > f_2$ and $f_i < f_3$ | BPF3 (44) |
| $f_i > f_3$ | BPF4 (45) |

As described above, after the sync is acquired, since the narrow subband characteristics are sequentially selected, an excessive level signal with a frequency outside the subband characteristic now selected coming from another station is blocked. As a result, the generation of spurious components such as higher harmonic components arising from the non-linear operation of the mixer 5 due to an excessive level is remarkably reduced.

Figure 6:
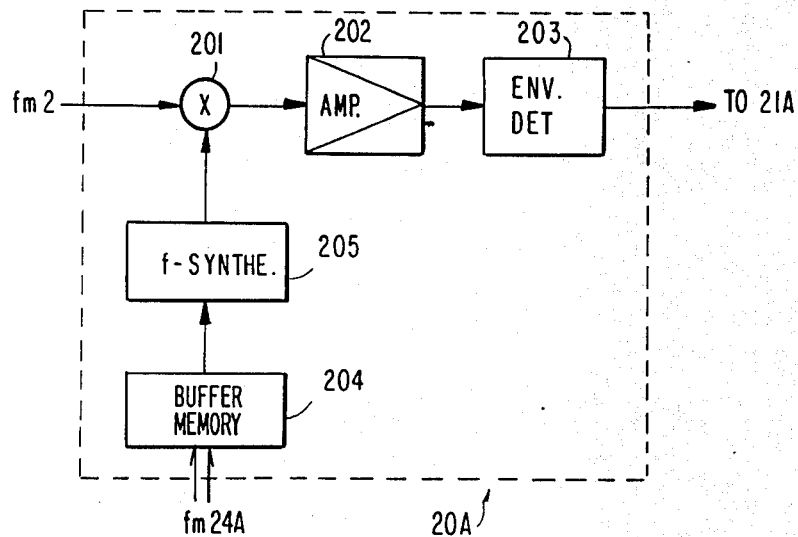
FIG. 6 is a block diagram of each receiving channel in a synchronizing section in FIG. 1.

Returning now to FIG. 1, the sync section according to the present invention will be described. The sync action is provided with three receiving channels 20A to 20C for selecting SS signals of the consecutive three waiting frequencies $f_{111}$ to $f_{113}$ which are previously selected from among the hopping frequencies. Each receiving channel, as shown in FIG. 6, is comprised of a mixer 201, an IF-AMP 202, an envelope detector 203, a buffer memory 204 for storing a code pattern to set a frequency to be supplied, and a frequency synthesizer 205 for producing a local reference signal, of a frequency lower than the set frequency of a frequency by the intermediate frequency, from the buffer memory 204. These components may be constructed by using known parts which are commercially available. The output signals from the receiving channels 20A and 20B for timing the output signals from the three receiving channels are delayed by 2T (T is a chip time) and T, through delay lines 21A and 21B, respectively. The output signals from the receiving channels 20A to 20C thus timed are added in the adder 22. Then, the added signal is compared with an experimentally determined threshold value by the comparator 23. When the added signal is above the threshold value, it is judged that the sync acquisition is attained and the sync detected signal is produced from the comparator 23. The sync detected signal switches the RF switches 1 and 2 to select the narrow band filter 4 as previously mentioned.

The set frequencies $f_{111}$ to $f_{113}$ in the receiving channel may be set at proper frequencies. These frequencies may manually be set in the buffer memory 204 previously. In order to removing the increasing of the hardware and timing problems which may arise if the code generator is provided individually for each of the receiving channels, one M-sequence code generator 14 is used in the present invention.

The shift register 17 is a serial-in and parallel-out type shift register having four stages. The output terminals $Q_0$ to $Q_3$ for each shift register 17 sequentially produce pulse signals every time it receives the clock pulse from the clock source 12, but the shift register 17 does not change its output rate for the fifth and subsequent pulses. A reset signal produced from the sync monitor 19 resets the shift registe 17. The switch 13 operates together with the power source switch for actuating the receiving system and allows the clock pulse from the clock source 12 to go to the M-sequence generator 14. In response to the generation of the pulse signal from the output terminal $Q_3$, the switch 13 is opened to stop the supply of the clock pulse. The switch 13 is also opened when the sync detected signal from the comparator 23 arrives, but is closed when a reset signal indicating the off-sync or async arrives from the sync monitor 19. Such operation may be obtained by additionally using a very simple known gate circuit (not shown). Latch registers 24A to 24C constituted of D-type flip-flops operate at the leading edge of the clock pulse applied to the clock input terminal CLK to latch the code pattern from the M-sequence generator 14. The outputs of the latch registers 24A to 24C are connected to the inputs of buffer memories of the corresponding receiving channels 20A to 20C, respectively. The operation for setting the waiting frequencies in the receiving channels will be described below.

When the receiver operates upon power on, the switch 13 is closed and four clock pulses are supplied from the clock source 12 to the M-sequence generator 14 which in turn generates the code patterns corresponding to the frequencies $f_{111}$ to $f_{114}$. The shift register 17 responds to the first clock pulse from the clock source 12 to produce an output signal at the output terminal $Q_0$. The output signal is then applied to the CLK terminal of the latch register 24A. In response to the clock pulse, the latch register 24A fetches the M-sequence code pattern (corresponding to the frequency $f_{111}$) and applies it to the buffer memory 204 in the receiving channel 20A. Subsequently, in response to the 2nd and 3rd clock pulses, pulses are supplied from the output terminals $Q_1$ and $Q_2$ of the shift register 17 to the latch registers 24B and 24C, so that the frequencies $f_{112}$ and $f_{113}$ are set in the receiving channels 20B and 20C, respectively. When the 4th pulse is supplied from the clock source 12 to the shift register 17, an output signal appears at the output terminal $Q_3$ to render the switch 13 open. The shift register 17 does not respond to the subsequent clock signals to the terminal CLK. In other words, the output state from the terminals $Q_0$ to $Q_3$ does not change for the subsequent clock signals. At this time, the M-sequence generator 14 produces a code pattern corresponding to the frequency $f_{114}$ in response to the 4th clock, while the frequency synthesizer 15 supplies the local reference signal of a frequency lower than the frequency $f_{114}$ by the IF to the mixer 5 and is ready for the sync acquisition.

Figure 8:
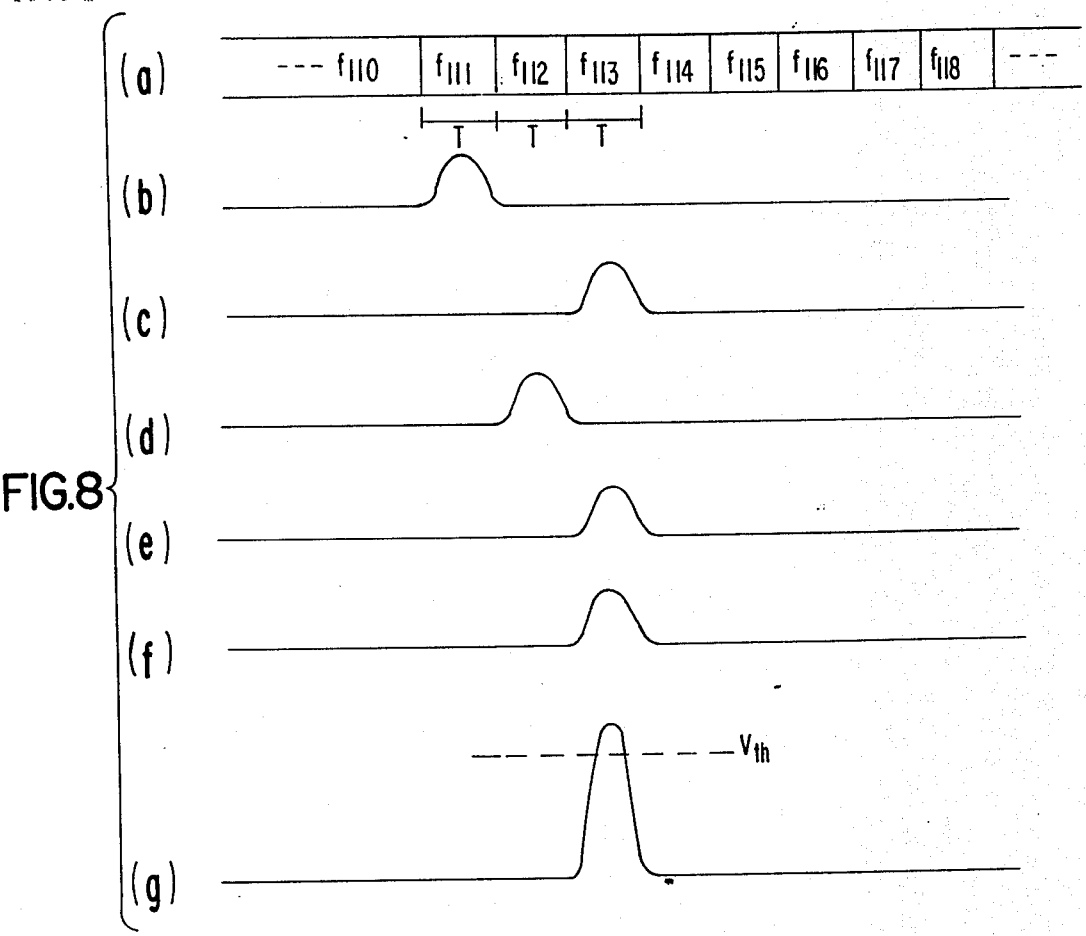
FIG. 8, including $a$–$g$, shows a timing chart for illustrating a sequence of the operation in the synchronizing section shown in FIG. 1.

In this way, the receiving channels 20A to 20C enter a state of the sync acquisition after the waiting frequency is set therein. The sync acquisition or search operation will be described referring to FIG. 8.

When the spread spectrum (SS) signal with a hopping pattern shown in FIG. 8(a) arrives, the mixer 201 of the receiving channel 20A produces a correlation output at the timing of the frequency $f_{111}$. The correlation output is amplified by the IF-AMP 202 and then is applied to the envelope detector 203 which produces an envelope output signal as shown in FIG. 8(b). Similarly, the envelope output signal from the receiving channel 20B is produced at the time that the SS signal of the frequency $f_{112}$ arrives, as shown in FIG. 8(d). The envelope output signal from the receiving channel 20C is produced at the arrival of the SS signal of the frequency $f_{113}$, as shown in FIG. 8(f). The output signals (b) and (d) of the receiving channels 20A and 20B are delayed by the time durations 2T and T by the delay lines 21A and 21B ((c), (e)), and together with the output signal (f) of the receiving channel 20C are applied to the adder 22. The output signal from the adder (g) is maximized when the sync is acquired and becomes smaller as the sync state deviates from the sync acquired point. For this reason, in the present embodiment, a threshold voltage Vth indicating the sync acquired state is applied as a reference value for the comparator 23. When the output signal from the adder 22 is larger than the threshold voltage Vth, the sync section judges that the sync is acquired to produce a sync detected signal.

When some trouble occurs after the sync is set up and the receiver is asynchronous, the sync monitor 19 which monitors a level variation in the output signal from the adder 18 produces a reset signal. In response to the reset signal, the respective portions of the receiver are reset to return to the initial operation state for searching the sync. More particularly, the RF switches 1 and 2 are turned to the broad band filter 3 by the reset signal, the shift register 17 is reset and the switch 13 is opened. Then, the waiting frequencies are set for the receiving channels 20A to 20C. The frequencies set at this time are not necessarily $f_{111}$ to $f_{113}$ but three adjacent frequencies consecutive to the frequency generated from the M-sequence generator 14 are set in the receiving channels. For this reason, when interference and jamming signals of the frequency sequence $f_{111}$-$f_{112}$-$f_{113}$ accidentally arrive, the receiver rapidly responds to the arrival of these undesired waves to set additional waiting frequencies in the receiving channels. In this respect, the receiver has good characteristic for anti-interference and anti-jamming. In other words, when receiving such undesired signals, the sync monitor 19 initially judges that the sync is achieved, but immediately detects the off-sync and produces a reset signal. As a result, the receiving channels have additional waiting frequencies set therein. In this case, there is a great possibility that the additionally set frequencies are different from those of the interference signals. Therefore, the error sync can be prevented at this stage.

Figure 7:
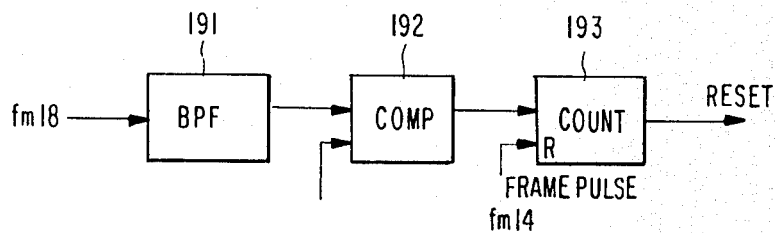
FIG. 7 is a block diagram showing an arrangement of a synchronization monitor 19 in FIG. 1.

The sync monitor 19 is comprised of a narrow band BPF 191, a comparator 192 and a counter 193, as shown in FIG. 7. The output signal from the adder 18 passes through the narrow band BPF 191 with a high Q of about 400 of which the center frequency is the clock frequency of the clock source 12 for removing the unnecessary signals. The filtered signal level is compared with a predetermined threshold value for each chip by the comparator 192. When the input signal is below the threshold level, the comparator 192 produces a pulse signal. The counter 193 is reset for each period (one frame) of the output signal from the M-sequence generator 14 and counts the pulses from the comparator 192. When the input signal level exceeds a given value, it judges that the sync state is off its complete sync to produce a reset signal.

As seen from the foregoing, by merely using the number of receiving channels much less than that of the hopping frequencies, the sync search is possible during a short period of time within a hopping pattern period. In the above-mentioned embodiment, the number of the receiving channels is three, but may be properly selected taking a state of the communication line such as S/N and the scale of the necessary hardware into consideration.

Figure 9:
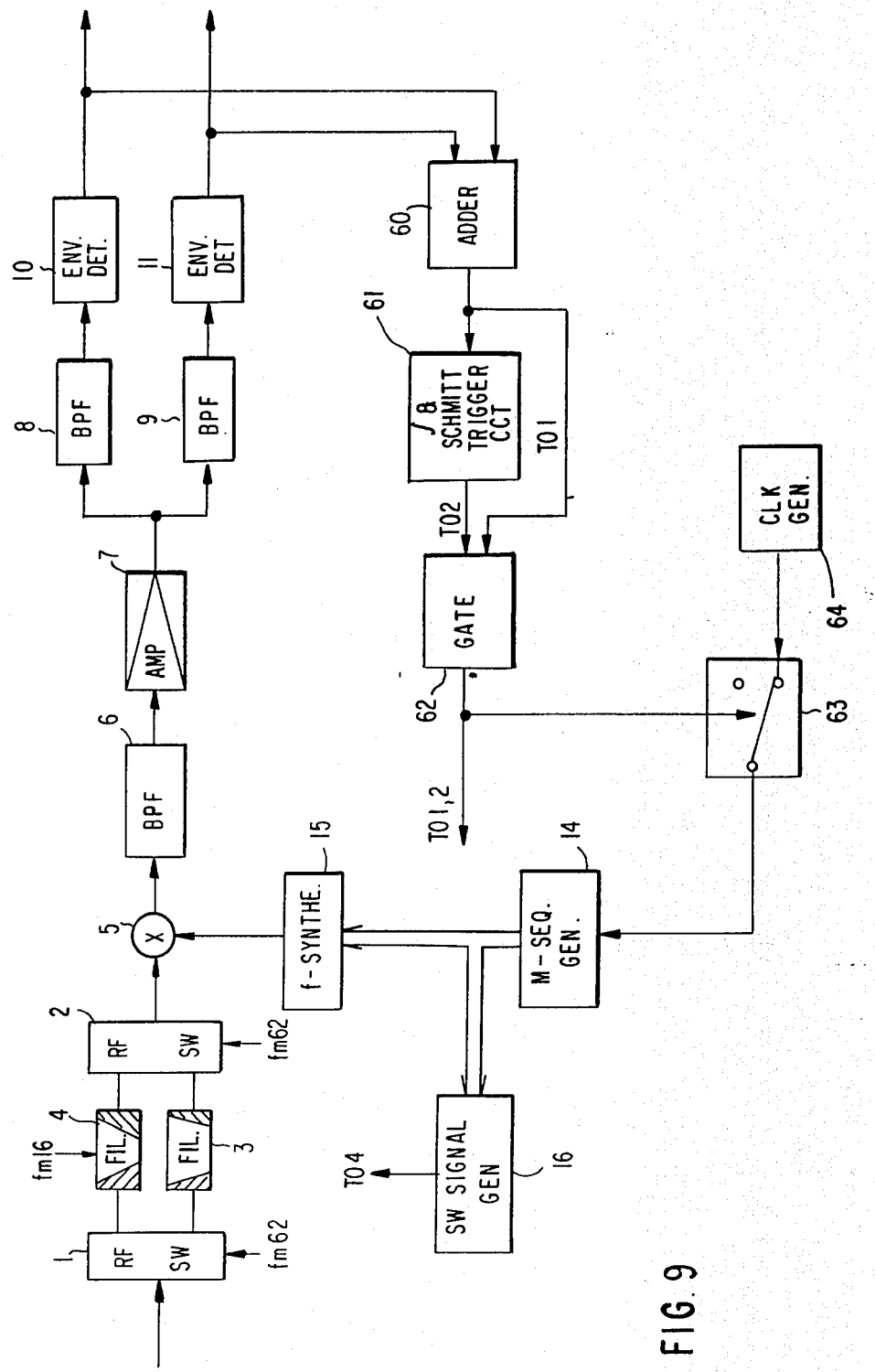
FIG. 9 is a block diagram illustrating a scheme of a receiver in a frequency hopping communication system having another synchronizing section according to the present invention.

The present invention proposes another sync search means with a simpler construction than that of the FIG. 1. While the sync search means in FIG. 1 is of the plural-frequency waiting type, this second sync search means is of a single-frequency waiting type. In FIG. 9, reference numerals 1 to 11 and 14 to 16 designate the same portions as those in FIG. 1. A leading part of the sync section is made up of an adder 60 for adding the output signals from the envelope detectors 10 and 11, an integration Schmitt trigger circuit 61 for integrating the output signal from the adder 60 and for producing a pulse signal when the integrated value exceeds a predetermined value, a gate circuit 62 coupled with the outputs of the integrator 60 and the circuit 61, and a reset switch 63 for supplying the clock pulse from the clock source 64 to the M-sequence generator 14.

The frequency synthesizer 15 supplies to the mixer 5 a local reference signal of a frequency which is lower by an intermediate frequency, than a frequency (which is a waiting frequency denoted as $f_{211}$) corresponding to a code pattern being generated by the M-sequence generator 14. Under this condition, when the $f_{211}$ signal arrives, the correlation signal in the IF band is produced from the mixer 5 and an envelope output signal appears at the output of the adder 60. Subsequently, when signals of frequencies determined by the output signals from the M-sequence generator 14 successively arrive, the integrated value in the circuit 61 exceeds the threshold value to provide the pulse signal. The gate circuit 62 performs a logic judgement to be given below on the basis of two input signals to control the operation of the sync system.

The gate circuit 62, having a gate function, produces an output signal when at least one of the input signals is present.

Figure 10:
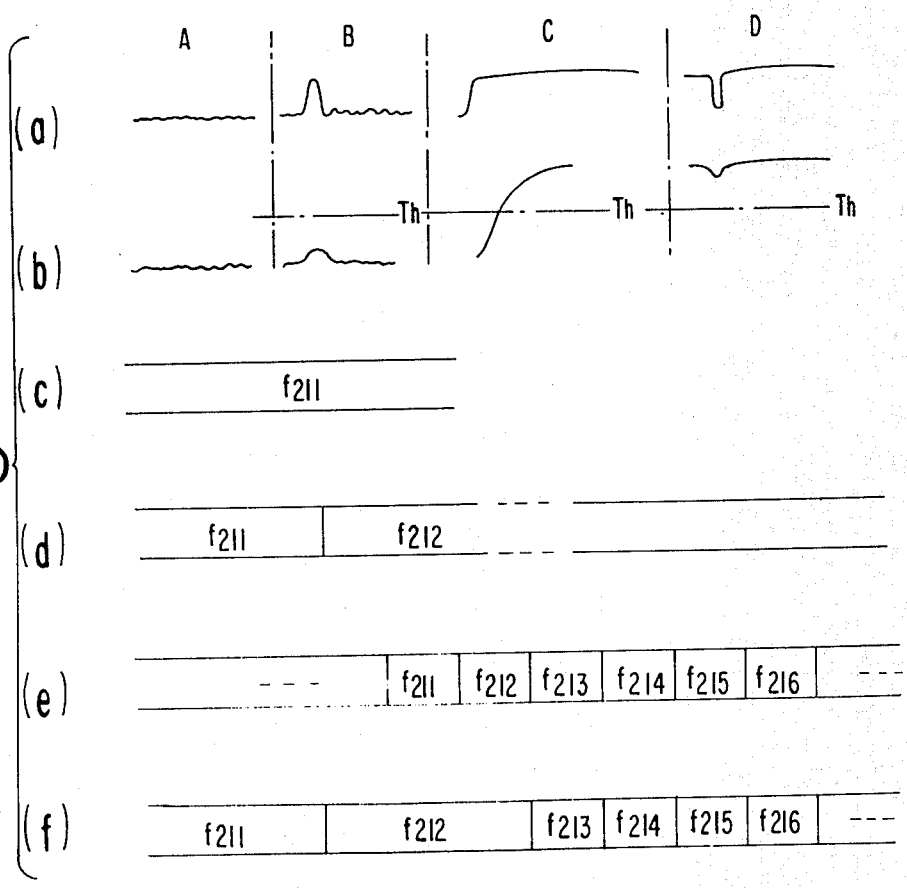
FIG. 10, including $a$–$f$, is a timing chart useful in explaining a sequence of the operation of the synchronizing section shown in FIG. 9.

The operation of the sync system will be described referring to FIG. 10 illustrating a timing chart. FIGS. 10(a) and 10(b), respectively, illustrate an output signal 601 from the adder 60 and an output signal 602 from the integration Schmitt trigger circuit 61 in four states. In the A state, neither of the outputs 601 and 602 are present and the sync is not achieved; in the B state, a CW interference signal of the same frequency as the waiting frequency $f_{211}$ arrives; in the C state, both the output signals 601 and 602 are present and the sync is achieved; in the D state, a chip-drop, or chip-drops, takes place in the envelope output signal 601 due to fading and the like.

In the asynchronous state A, no output signal is produced from the gate circuit 62, so that no clock pulse is supplied to the M-sequence generator 14, and thus the waiting frequency $f_{211}$ remains unchanged. Under this condition, when the CW interference signal or CW jamming signal (see FIG. 10(c)) of $f_{211}$ arrives, a single clock pulse is supplied from the clock source 64 to the M-sequence generator 14. Accordingly, the M-sequence generator 14 supplies the code pattern of a frequency $f_{212}$, not $f_{211}$, to the frequency synthesizer 15, as shown in FIG. 10(d). Subsequently, the mixer 5 does not produce a correlation output, so that the integrated value in the integration Schmitt trigger circuit 61 fails to reach the threshold value, resulting in no production of the signal 602. The waiting frequency then changes to $f_{212}$. When a desired SS signal as shown in FIG. 10(e) arrives, a correlation output is produced at the time of $f_{212}$ and the envelope output signal is supplied to the gate circuit 62, the reset switch 63 is driven to allow the clock pulse to go to the M-sequence generator 14. As a result, the M-sequence generator 14 produces a code pattern corresponding to the next frequency $f_{213}$, and as in the above case, the gate circuit 62 produces an output signal, and then the M-sequence generator 14 sequentially generates code patterns corresponding to the frequencies $f_{214}$, $f_{215}$, $f_{216}$, ..., as shown in FIG. 10(f). After a given lapse of time, the integrated value exceeds the threshold value of the Schmitt trigger, so that the both input signals to the gate 62 are present and the sync is set up. This state corresponds to the state C.

Let us consider a case where a chip drop, i.e. an instantaneous disappearance of the envelope output signal 601, takes place due to a fading or the like, under this condition. In this case, when the chip drop is instantaneous, the output signal from the integration Schmitt trigger circuit 61 continues even if no output signal 601 is produced, and therefore the reset switch 63 is left driven. Accordingly, if the chip drop takes place, the sync state can be kept.

Thus, in the sync system according to the present invention, when either of the envelope output signal or the integration Schmitt trigger output signal is produced, it is judged that the sync is achieved and the system is driven. If it erroneously operates due to interference signals or the like, the sync system is automatically stopped and another waiting frequency is set up. Accordingly, the sync system of the present invention is almost immune to CW jamming signals and to faults such as chip-drops. Additionally, construction of the hardware is very simple and the sync search time is short. The logical states of the sync system and the states A to D shown in FIG. 10 are tabulated below.

| Output 601 | Output 602 | Gate Output | State |
| --- | --- | --- | --- |
| 0 | 0 | 0 | A |
| 1 | 0 | 1 | B |

-continued

| Output 601 | Output 602 | Gate Output | State |
|---|---|---|---|
| 1 | 0 | 1 | B |
| 1 | 1 | 1 | C |
| 0 | 1 | 1 | D |

What is claimed is:

1. A receiver in a frequency hopping communication system comprising:
    filter means having a broad band-pass filter with a band characteristic including a spread spectrum bandwidth, a narrow band-pass filter having selectable band characteristics including bandwidths into which said spread spectrum bandwidth is divided, a band characteristic of said narrow band-pass filter being selected in response to a selection signal applied thereto, and means for making switch-over from said broad band-pass filter to said narrow band-pass filter in response to a synchronization detected signal applied thereto;
    a code generator for generating code patterns to determine a time-sequential pattern of predetermined hopping frequencies;
    a clock source for generating clock pulses for driving said code generator;
    a frequency synthesizer for producing a signal of a frequency determined by an output signal from said code generator;
    synchronization acquisition means for synchronizing the output signal from said frequency synthesizer and the output signal from said filter means to produce said synchronization detected signal when synchronization is set up;
    selection signal generating means for generating said selection signal in response to the output signal from said code generator;
    correlating means for correlating the output signals from said filter means and said frequency synthesizer to remove the modulation of said frequency hopping; and
    demodulating means for extracting an information signal from the output of said correlating means.

2. The receiver as claimed in claim 1, wherein said narrow band-pass filter is a single filter of which the center frequency is variable and determined by said selection signal.

3. The receiver as claimed in claim 2, wherein said single filter is an L-C resonance circuit including a variable capacitance diode.

4. The receiver as claimed in claim 1, wherein said selection signal generating means is a D/A converter.

5. The receiver as claimed in claim 1, wherein said narrow band-pass filter includes a plurality of band-pass filters with band characteristics of said subbands, and high frequency switch means for selecting one band-pass filter from the plurality of said band-pass filters in response to said selection signal.

6. The receiver as claimed in claim 1, wherein said synchronization acquisition means includes N receiving channels of for selectively receiving signals of predetermined different frequencies, said N being a natural number and less than the total number of hopping frequencies, delay means for delaying the output signals from said receiving channels by given delay times to time the output signals of said N channel receivers, adder means for adding the output signals from said timed receiving channels, and synchronization judging means for generating said synchronization detected signal when the output signal from said adder means exceeds a predetermined threshold value.

7. The receiver as claimed in claim 6, wherein N=3.

8. The receiver as claimed in claim 6, wherein each of said receiving channels includes a memory for storing a code pattern from said code generator, a frequency synthesizer for generating a local reference signal of a frequency determined by said code pattern stored in said memory, correlating means for generating a correlation signal of said local reference signal and the output signal from said filter means, and detecting means for envelope-detecting the output signal from said correlating means.

9. The receiver as claimed in claim 8, further comprising a shift register having (N+1) output terminals and receiving said clock pulses for producing a pulse at each of said terminals from the first to (N+1)th in succession every time a clock pulse arrives from said clock source, switch means inserted between said clock source and said code generator for supplying said clock pulses to said code generator in response to said synchronization detected signal and for stopping the supply of said clock pulses to said code generator in response to a pulse from said (N+1)th terminal of said shift register, and 1st to Nth latch registers connected at clock terminals to the 1st to Nth terminals of said shift register, respectively, for latching the output signal from said code generator and supplying it to corresponding of said memories of said receiving channels in response to said pulse from said corresponding terminal of said shift register.

10. The receiver as claimed in claim 9, further comprising means for monitoring an output signal from said demodulating means to determine an off-synchronization condition, said switch means turning off when said monitoring means detects the off-synchronization.

11. The receiver as claimed in claim 10, wherein said monitor means includes detecting means for envelope-detecting said correlation output, a band-pass filter for filtering said envelope-detected signal in narrow bandwidth, of which the center frequency is the clock frequency of said clock source, a comparator for producing a pulse signal when the output signal from said band-pass filter is below a predetermined threshold value, and a counter which is reset by a frame pulse from said code generator and counts the output pulse from said comparator to produce a signal indicating the off-synchronization when the count value is above a predetermined value.

12. The receiver as claimed in claim 1, wherein said synchronization acquisition means is comprised of means for envelope-detecting the output signal from said correlating means to produce an output signal when said envelope-detected signal is above a predetermined level, integrating means for integrating the output signal from said detecting means to produce an output signal when the integrated value is above a predetermined value, and a gate circuit for producing said synchronization detected signal when either of the output of said detecting means and said integrating means is present.

13. The receiver as claimed in claim 12, further comprising a reset switch inserted between said code generator and said clock source for connecting said generator and said clock source in accordance with said synchronization detected signal.

* * * * *

UNITED STATES PATENT AND TRADEMARK OFFICE
CERTIFICATE OF CORRECTION

PATENT NO. : 4,435,821

DATED : March 6, 1984

INVENTOR(S) : Satoaki Ita and Hiroshi Harada

It is certified that error appears in the above-identified patent and that said Letters Patent is hereby corrected as shown below:

Column 1, line 7, insert a --,-- after "jamming";
　　　　　line 34, "communication" should be --communications--;
　　　　　line 35, "system" should be --systems--;
　　　　　line 66, "ZInc." should be --Inc.--.
Column 2, line 22, delete "to".
Column 3, line 13, at the end of the line insert --system.--.
Column 4, line 59, insert a --,-- after "14".
Column 5, line 56 after "quency" insert --of the circuit being--.
Column 7, line 20, --previously be-- should be inserted after "may";
　　　　　line 20, after "manually" delete "be";
　　　　　lines 20-21, delete "previously";
　　　　　line 21, delete "removing the" and insert --avoid an--;
　　　　　line 31, "rate" should be "state";
　　　　　line 33, "registe" should be --register--.
Column 8, line 65, "characteristic" should be --characteristics--.
Column 9, line 49, insert a --,-- after "lower".
Column 11, line 60, delete "of" before "for".

Signed and Sealed this

Fifth Day of June 1984

[SEAL]

Attest:

GERALD J. MOSSINGHOFF

Attesting Officer　　Commissioner of Patents and Trademarks